Sept. 29, 1936.   E. M. SPLAINE   2,055,914
OPHTHALMIC MOUNTING
Filed Sept. 9, 1935
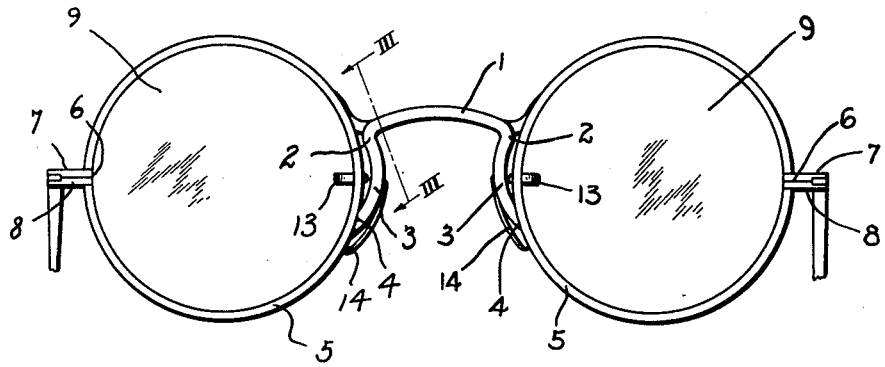
FIG. I
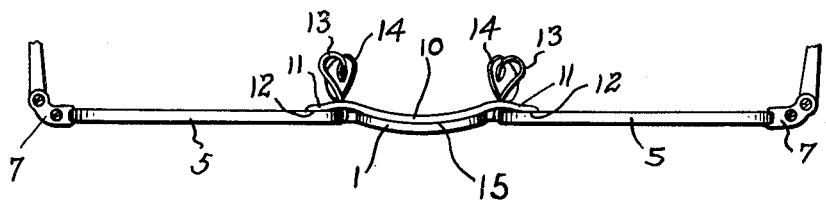
FIG. II
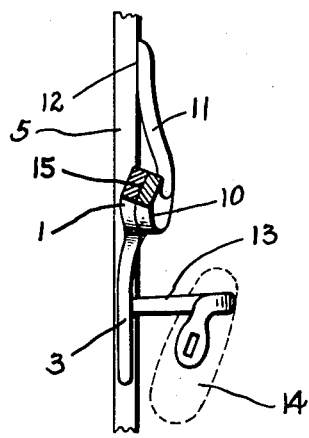
FIG. III
INVENTOR
Edward M. Splaine.
BY
Harry H. Styll.
ATTORNEY Patented Sept. 29, 1936

2,055,914

UNITED STATES PATENT OFFICE 2,055,914

OPHTHALMIC MOUNTING

Award M. Splaine, Southbridge, Mass., assignor to American Optical Company, Southbridge, Mass., a voluntary association of Massachusetts Application September 9, 1935, Serial No. 39,740

3 Claims. (Cl. 88—43)

This invention relates to improvements in ophthalmic mountings and has particular reference to improved means for connecting the lens holding means of said mountings.

One of the principal objects of the invention is to provide a bridge member for connecting the lens holding means of an ophthalmic mounting which will be exceptionally rigid and durable and yet desirable from an aesthetical viewpoint.

Another object of the invention is to provide improved means for reinforcing the means for connecting the lens holding means of an ophthalmic mounting whereby the said reinforcing means will be so located relative to the connecting means and to the lens holding means that it will be substantially invisible when the mounting is viewed from the front.

Another object of the invention is to provide a bridge member for connecting the lens holding means of an ophthalmic mounting whereby the central arch portion of the bridge will be reinforced and braced against movement up or down or sideways relative to the lens holding means during use.

Another object is to provide an ophthalmic mounting designed more particularly to withstand rough usage.

Other objects and advantages of the invention will become apparent from the following description taken in connection with the accompanying drawing, and it will be apparent that many changes and modifications in the arrangement and construction of parts shown and described may be made without departing from the spirit of the invention as expressed in the accompanying claims. I, therefore, do not wish to be limited to the exact details of construction and arrangements shown and described as the preferred form only has been shown by way of illustration.

Referring to the drawing:

Fig. I is a front elevation of an ophthalmic mounting embodying the invention;

Fig. II is a plan view of the mounting shown in Fig. I; and

Fig. III is an enlarged sectional view taken on line III—III of Fig. I.

The present invention is directed to the provision of an ophthalmic mounting adapted more particularly for use by children and which is designed to withstand rough usage. In instances when the corrective lenses have a cylindrical or prismatic correction incorporated therein for the correction of astigmatism or muscular defects, the axes of the lenses must be held in accurate prescribed position before the eyes. With most prior art structures much difficulty has been encountered in having the mounting become bent and distorted during use with a result that the lenses would be displaced from their prescribed axial positions before the eyes and cause serious ocular defects.

It has been found by past experience that the bending of the bridge portion of the mounting was perhaps more effective in displacing the lenses than any other part of the mounting and it, therefore, is one of the primary objects of this invention to provide a bridge for connecting the lens holding means of ophthalmic mountings wherein the central arch portion as well as the connections to the lens holding means will be greatly reinforced, and yet be pleasing and desirable from the aesthetical viewpoint.

Referring more particularly to the drawing wherein similar reference characters designate corresponding parts throughout the several views, the device embodying the invention comprises a relatively rigid central arch portion 1 having, as shown in Fig. I, downwardly curving end portions 2 which terminate in depending braces 3 attached at 4 to the lens holding means 5. The lens holding means in this instance are in the form of metallic eyewires divided at 6 and provided with endpiece members 7 and 8 for securing the divided ends 6 together to hold the lenses 9 in the rims. The central arch portion 1, as shown in Figs. II and III, is provided with a reinforcing crossbar 10 secured to the rear thereof substantially throughout its length by solder or other suitable means. The crossbar 10 is provided adjacent its ends with upwardly extending braces 11 which are shaped to engage the rear of the lens rims 5 and are secured thereto along their engaging faces, as indicated at 12, by solder or other suitable means. The portions of the braces 11 secured to the lens rims or holding means 5 are shaped to the adjacent contour of said rims or holding means and are substantially invisible when the mounting is viewed from the front. This also applies to the central crossbar portion 10 which lies in the rear of the central arch portion 1 of the bridge.

It is particularly pointed out that the ends 4 attached to the lens holding means are secured to the periphery of the nasal edges of the lens holding means and lie substantially in the plane of the lenses, while the outwardly extending portions 11 of the crossbar 10 are secured to the rear of the lens holding means and occupy a plane to the rear of the plane of the lenses when the mounting is viewed from the top. This provides offset points of attachment in directions both upwardly and downwardly and sidewise and thereby provides great resistance to strain in these directions. The central arch portion 1 and crossbar portion 10 are shaped to curve outwardly to clear the bridge of the nose of the wearer during use. The depending portions 3 curve inwardly from adjacent the ends 2 of the arch portion 1 to points substantially intermediate their ends wherein they are curved outwardly and extend downwardly substantially to the angle of the sides of the nose. The portions 3 are in spaced relation with the adjacent edge portions of the lens holding means or rims 5 and provide a clearance wherein the guard arms 13, supporting the nose guards 14, may be located and attached to said lens holding means or rims.

The portion 10 is curved or cupped to clear the nose of the wearer and adjacent its ends is curved rearwardly substantially to the ends 2 of the central arch portion wherein it extends upwardly and forwardly at 11 to engage the rear of the lens holding means or rims 5. The upwardly extending portions 11 are provided along their sides adjacent the lens holding means or rims 5 with relatively long contacting surfaces which are secured substantially throughout their lengths, as illustrated at 12, to the rear of the lens holding means to provide positive and rigid connections.

As previously stated, the central arch portion 1 and crossbar 10 are secured in superimposed relation with each other throughout the interengaging surfaces thereof, as illustrated at 15, and provide double strength throughout this portion of the bridge.

The brace members 11 and 3 provide rigid and durable connections with the lens holding means, and when combined with the reinforced central arch portion 1, provide a rigid and durable structure.

The solder connections at the rear of the mounting, as illustrated at 12, combined with the solder connections at the peripheral edges of the lens holding means or rims 5, as illustrated at 4, and lying in different planes, provide means whereby the various parts will maintain their fitted and assembled relation with each other during use.

From the foregoing description it will be seen that I have provided simple, efficient and economical means of obtaining all the objects and advantages of the invention, particularly that of providing a more rigid and durable bridge connection for supporting the lens holding means of ophthalmic mountings and which is pleasing and desirable from the aesthetical standpoint.

Having described my invention, I claim:

1. A bridge for connecting the lens holding means of an ophthalmic mounting comprising a central arch portion curving rearwardly adjacent its ends to downwardly extending portions secured adjacent their ends to the peripheral edges of the lens holding means and a reinforcing brace bar having a portion shaped substantially to the general shape of the central arch portion and secured to said portion and having upwardly extending brace portions terminating in ends attached to the lens holding means, the attaching ends of the downwardly extending portions of the bridge member being secured to the peripheral edges of the lens holding means and the upwardly extending portions of the brace bar being secured to the rear of the lens holding means.

2. A bridge for connecting the lens holding means of an ophthalmic mounting comprising a central arch portion curving rearwardly adjacent its ends to downwardly extending portions secured adjacent their ends to the lens holding means and a reinforcing brace bar having a portion shaped substantially to the general shape of the central arch portion and secured to said portion and having outwardly extending brace portions terminating in ends attached to the lens holding means, one set of one or the other of the attaching ends of the respective downwardly extending portions and the attaching ends of the outwardly extending portions being secured to the peripheral edges of the lens holding means and the other set to the rear of the lens holding means.

3. A bridge for connecting the lens holding means of an ophthalmic mounting comprising a central arch portion curving rearwardly adjacent its ends to relatively long downwardly deflected portions lying substantially in the plane of the lens holding means and secured adjacent their ends to said lens holding means and a reinforcing brace bar having a portion shaped substantially to the general shape of the central arch portion throughout the length of said portion and secured to said portion in the rear thereof so as to be substantially invisible when the mounting is viewed from the front and having outwardly extending brace portions terminating in ends attached to the lens holding means at points removed from the attaching ends of said downwardly deflected portions of the central arch portion and providing means for supporting the central arch portion against bending in or out relative to the plane of the lens holding means about the attaching ends of the downwardly deflected portions during use.

EDWARD M. SPLAINE.